United States Patent
Weng

(10) Patent No.: US 9,686,303 B2
(45) Date of Patent: Jun. 20, 2017

(54) WEB PAGE VULNERABILITY DETECTION METHOD AND APPARATUS

(71) Applicant: Tencent Technology (Shenzhen) Company Limited, Shenzhen (CN)

(72) Inventor: Jiacai Weng, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/112,492

(22) PCT Filed: Jun. 10, 2015

(86) PCT No.: PCT/CN2015/081117
§ 371 (c)(1),
(2) Date: Jul. 19, 2016

(87) PCT Pub. No.: WO2015/188743
PCT Pub. Date: Dec. 17, 2015

(65) Prior Publication Data
US 2016/0337392 A1 Nov. 17, 2016

(30) Foreign Application Priority Data
Jun. 11, 2014 (CN) .......................... 2014 1 0258536

(51) Int. Cl.
*G06F 21/56* (2013.01)
*H04L 29/06* (2006.01)
(Continued)

(52) U.S. Cl.
CPC .......... *H04L 63/1433* (2013.01); *G06F 17/30* (2013.01); *G06F 21/577* (2013.01);
(Continued)

(58) Field of Classification Search
None
See application file for complete search history.

(56) References Cited

U.S. PATENT DOCUMENTS 8,806,646 B1* 8/2014 Daswani ............. H04L 63/1425
713/161
8,826,438 B2* 9/2014 Perdisci ................ G06F 21/56
709/236
(Continued)

FOREIGN PATENT DOCUMENTS

CN 101872323 A 10/2010
CN 103685290 A 3/2014

OTHER PUBLICATIONS

CN103077348. English Transalation. Huawei Technologies. Dec. 28, 2012.*

(Continued)

*Primary Examiner* — Venkat Perungavoor
(74) *Attorney, Agent, or Firm* — Bookoff McAndrews, PLLC

(57) ABSTRACT

A Web page vulnerability detection method and apparatus are described, where the method can receive a vulnerability detection task for performing vulnerability detection on a to-be-detected target Web page; acquiring a configuration file corresponding to the vulnerability according to the vulnerability detection task. The vulnerability detection task being is at least used to indicate a vulnerability that needs to be detected, and the configuration file includes a matching condition used to match the to-be-detected target Web page in to-be-detected Web pages and indication information of a test sample used to perform vulnerability detection on the to-be-detected target Web page. The method also detects whether the vulnerability indicated by the configuration file exists on the to-be-detected target Web page by using the configuration file.

19 Claims, 5 Drawing Sheets

(51) Int. Cl.
| | |
|---|---|
| *G06F 21/57* | (2013.01) |
| *G06F 21/62* | (2013.01) |
| *G06F 17/30* | (2006.01) |
| *H04L 29/14* | (2006.01) |
| *H04W 4/14* | (2009.01) |
| *H04L 29/08* | (2006.01) |

(52) U.S. Cl.
CPC .... *G06F 21/6209* (2013.01); *G06F 2221/033* (2013.01); *H04L 67/02* (2013.01); *H04W 4/14* (2013.01)

(56) References Cited

U.S. PATENT DOCUMENTS

| | | | |
|---|---|---|---|
| 2006/0101519 A1 | 5/2006 | Lasswell et al. | |
| 2010/0050263 A1 | 2/2010 | Weisman | |
| 2012/0036580 A1* | 2/2012 | Gorny | H04L 63/1433 726/25 |
| 2012/0079596 A1* | 3/2012 | Thomas | G06F 21/55 726/24 |

OTHER PUBLICATIONS

International Search Report issued in corresponding International Application No. PCT/CN2015/081117, mailed Aug. 27, 2015 (2 pages).
Written Opinion of the International Searching Authority issued in corresponding International Application No. PCT/CN2015/081117, mailed Aug. 27, 2015 (3 pages).

\* cited by examiner

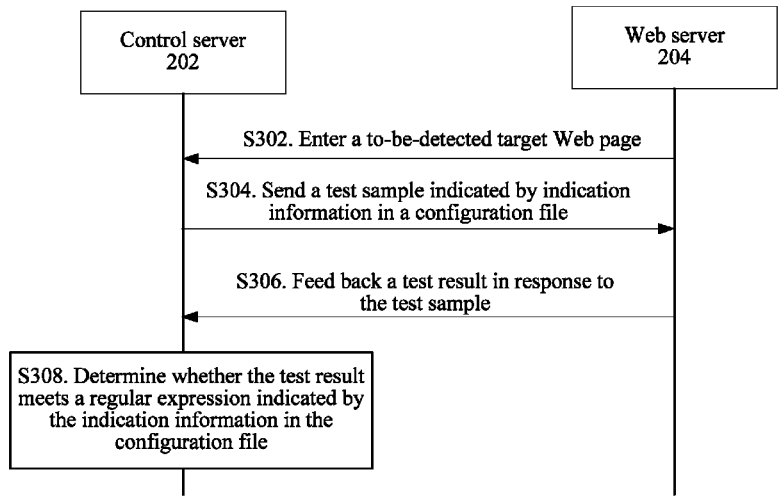

FIG. 3

```
<rules rulename="Rule description information">
    <rule id=1  cveid=110003002 level=70>
        <urltype>RL type</urltype>
        <suffix>URL suffix</suffix>
    <suffix_method>Suffix splicing manner</suffix_method>
        <itest>test sample</itest>
    <iwhere>Place at which the test sample is entered</iwhere>
<imethod>Manner in which the test sample is entered</iMethod>
        <owhere>Place for regular matching</owhere>
        <regexp>Regular expression</regexp>
        <msg>Vulnerability description information</msg>
    </rule>
</rules>
```

FIG. 4

WEB PAGE VULNERABILITY DETECTION METHOD AND APPARATUS

CROSS-REFERENCE TO RELATED APPLICATIONS

This application is the U.S. National Phase application under 35 U.S.C. 371 of International Application PCT/CN2015/081117, filed Jun. 10, 2015, which claims the benefit of priority to Chinese Patent Application No. 201410258536.3, filed on Jun. 11, 2014, the entire contents of which, for each of the aforementioned applications, are hereby incorporated by reference.

FIELD OF THE TECHNOLOGY

The present disclosure relates to computer technology, and specifically, to a Web page vulnerability detection method and apparatus.

BACKGROUND OF THE DISCLOSURE

Currently, a Web page vulnerability generally refers to a vulnerability in a Web application, and may be a vulnerability caused by a cause such as a code writer being incogitant when writing code. A common Web vulnerability includes Sql injection, an Xss vulnerability, an uploading vulnerability, and the like. If a Web vulnerability exists on a website and is utilized by a hacker attacker, the attacker may easily control the entire website, and may further acquire rights of a Web server through privilege escalation, to control the entire server.

However, a vulnerability detection manner currently adopted is: for a type of vulnerability, scanning the vulnerabilities one by one by using a vulnerability scanner. When this vulnerability detection manner is adopted, a targeted detection algorithm needs to be developed for different types of vulnerabilities, therefore causing detection efficiency to greatly decrease, which is not beneficial to protect a user terminal, and makes the user terminal vulnerable to an attack in this period.

SUMMARY

In view of the above, embodiments of the present invention provide a Web page vulnerability detection method and apparatus, which can enhance an efficiency of detecting a Web page vulnerability in case of detection algorithms need to be separately developed for different types of Web page vulnerabilities.

According to one aspect of embodiments of the present invention, a Web page vulnerability detection method is provided, where the method includes: receiving a vulnerability detection task for performing vulnerability detection on a to-be-detected target Web page, the vulnerability detection task being at least used to indicate a vulnerability that needs to be detected; acquiring a configuration file corresponding to the vulnerability according to the vulnerability detection task, the configuration file including a matching condition used to match the to-be-detected target Web page in to-be-detected Web pages and indication information of a test sample used to perform vulnerability detection on the to-be-detected target Web page; and detecting whether the vulnerability indicated by the configuration file exists on the to-be-detected target Web page by using the configuration file.

According to another aspect of embodiments of the present invention, a Web page vulnerability detection apparatus is further provided, including: a receiving unit, configured to receive a vulnerability detection task for performing vulnerability detection on a to-be-detected target Web page, the vulnerability detection task being at least used to indicate a vulnerability that needs to be detected; an acquiring unit, configured to acquire a configuration file corresponding to the vulnerability according to the vulnerability detection task, the configuration file including a matching condition used to match the to-be-detected target Web page in to-be-detected Web pages and indication information of a test sample used to perform vulnerability detection on the to-be-detected target Web page; and a detection unit, configured to detect whether the vulnerability indicated by the configuration file exists on the to-be-detected target Web page by using the configuration file.

In embodiments of the present invention, according to a task for detecting a vulnerability that needs to be detected, of a to-be-detected target Web page, a configuration file corresponding to the vulnerability is acquired, where the configuration file includes at least matching conditions and test samples that are set for different types of vulnerabilities. Arguments corresponding to the matching conditions and the test samples in the configuration file are added or modified, so that in a case in which a complex detection algorithm does not need to be developed again, detection may be performed on the different types of Web page vulnerabilities, achieving an objective of saving time costs of the vulnerability detection, thereby achieving a technical effect of improving detection efficiency of the vulnerability detection, and furthermore solving a technical problem in the existing technology that efficiency of detecting a Web page vulnerability is low because corresponding detection algorithms need to be separately developed for the different types of Web page vulnerabilities.

BRIEF DESCRIPTION OF THE DRAWINGS

Accompanying drawings described herein are used to provide further understanding about the present disclosure, and constitute one portion of this application; and schematic embodiments of the present invention and their description are used to explain the present disclosure, and do not constitute an inappropriate limit on the present disclosure. In the accompanying drawings:

FIG. 3 illustrates a schematic interaction diagram of an optional Web page vulnerability detection method according to an embodiment of the present invention;

FIG. 4 illustrates a schematic diagram of a configuration file in an optional Web page vulnerability detection method according to an embodiment of the present invention;

DESCRIPTION OF EMBODIMENTS

To make a person skilled in the art better understand solutions of the present disclosure, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

It should be noted that, the specification, claims, and terms "first" and "second" in the foregoing accompanying drawings are used to distinguish similar objects, but are unnecessarily used to describe a specific sequence or order. It should be understood that, data used in this way can be interchanged in an appropriate case, so that the embodiments of the present invention that are described herein can be implemented in a sequence other than those sequences illustrated or described herein. In addition, terms "include" and "have" and any of their variations are intended to cover nonexclusive including, for example, a process, method, system, product, or device that includes a series of steps or units do not have to be limited to those clearly listed steps or units, but may include another step or unit that is not clearly listed or is inherent to these process, method, product, or device.

Embodiment 1

Figure 1:
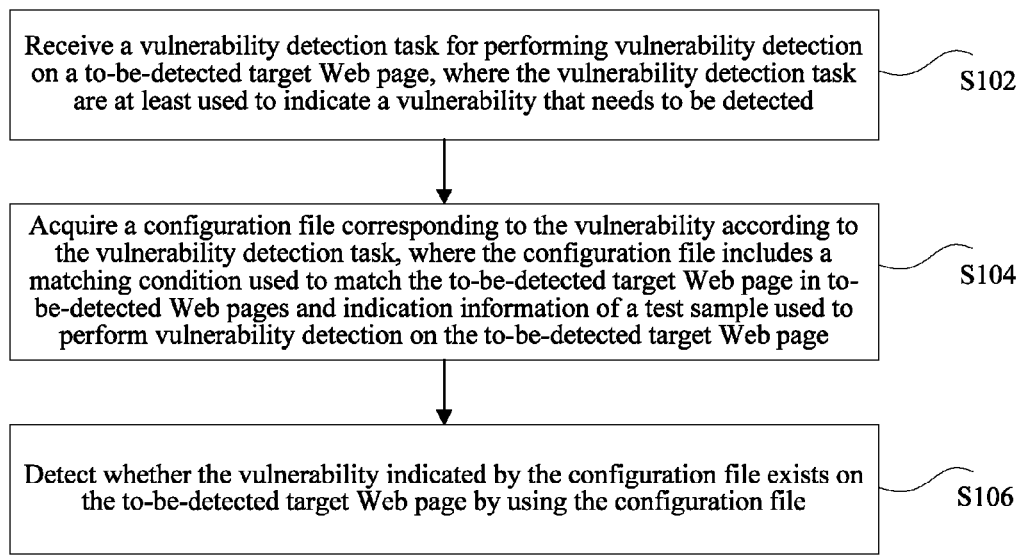
FIG. 1 illustrates a schematic flowchart of an optional Web page vulnerability detection method according to an embodiment of the present invention.

According to this embodiment of the present invention, a Web page vulnerability detection method is provided, as shown in FIG. 1, and the method includes:

S102: Receive a vulnerability detection task for performing vulnerability detection on a to-be-detected target Web page, where the vulnerability detection task are at least used to indicate a vulnerability that needs to be detected.

S104: Acquire a configuration file corresponding to the vulnerability according to the vulnerability detection task, where the configuration file includes a matching condition used to match the to-be-detected target Web page in to-be-detected Web pages and indication information of a test sample used to perform vulnerability detection on the to-be-detected target Web page.

S106: Detect whether the vulnerability indicated by the configuration file exists on the to-be-detected target Web page by using the configuration file.

Figure 2:
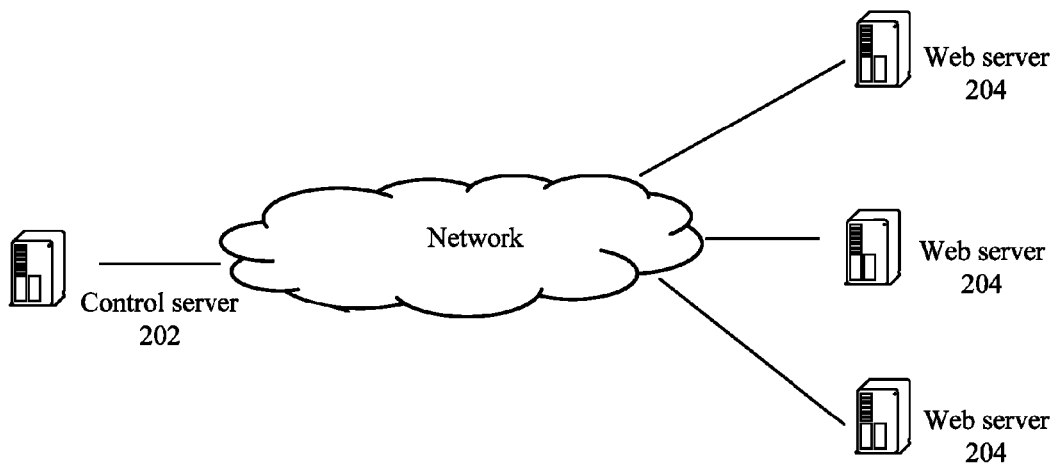
FIG. 2 illustrates a schematic diagram of an optional hardware scenario in which a Web page vulnerability detection method is applied according to an embodiment of the present invention.

Optionally, in the embodiment, the Web page vulnerability detection method may be applied in a hardware environment shown in FIG. 2, which is formed by a control server 202 and multiple Web servers 204. As shown in FIG. 2, the control server 202 is connected to the multiple Web servers 204 by using a network, where the network includes but is not limited to: a wide area network, a metropolitan area network, or a local area network. The control server 202 performs, by using the configuration file, vulnerability detection on any Web server 204 in which the to-be-detected target Web page is located, where the to-be-detected target Web page is a Web page for performing vulnerability detection, which matches the configuration file and is screened out from the to-be-detected Web pages.

Optionally, for different types of Web page vulnerabilities, there may be different configuration templates, and different configuration files are generated for different vulnerability detection tasks according to a same configuration template or different configuration templates, where the configuration template includes an argument corresponding to the matching condition and the test sample in the configuration file, arguments in the different configuration templates are different, and values of the argument in the different configuration files that are generated according to the same configuration template are different. Furthermore, it is implemented that the vulnerability detection is performed on the different types of Web page vulnerabilities by using the configuration templates, to achieve an objective of improving efficiency of detecting a Web page vulnerability. The foregoing example is only one example, and this embodiment does not have any limit on the foregoing example.

Optionally, in the embodiment, the vulnerability detection task may include but is not limited to indicating a vulnerability that needs to be detected, and indicating a to-be-detected target Web page that needs to be detected, where information for indicating the to-be-detected target Web page may include at least a type of the to-be-detected Web pages, and a suffix of the to-be-detected target Web page.

Optionally, in the embodiment, the configuration file further includes at least one of the following: description information of the configuration file, a sequence number of the configuration file, a risk level of the vulnerability indicated by the configuration file, a configuration condition, and a test sample, where the configuration condition includes but is not limited to: a predetermined type and a predetermined suffix, where the predetermined type is used to match a type of an address of a to-be-detected Web page, and the predetermined suffix is used to match a suffix whose type is the predetermined type; and the indication information of the test sample includes at least: an address of the test sample, an input manner of the test sample, description information of a vulnerability indicated by the test sample, and a regular expression indicated by the test sample.

Optionally, in the embodiment, the matching condition is used to screen the to-be-detected Web pages, to obtain the to-be-detected target Web page on which the vulnerability that needs to be detected exists, where the predetermined type in the matching condition may include but is not limited to: a type for matching the address of the to-be-detected Web page, for example, the type may be a CGI, a static page, or a directory. For example, the CGI is a Web page on which a user enters a parameter for a variable, for example, a.php?user=bingo. The predetermined suffix in the matching condition may be but is not limited to a suffix for matching an address whose type is the predetermined type, for example, for a structs vulnerability, only a CGI whose suffix is .action or .do.

Specifically with reference to the following example, FIG. 4 shows a schematic diagram of the configuration file, where "rulename" indicates description information of the configuration file. One configuration file may consists of multiple arguments; "cveid" is a unique sequence number of the configuration file, so as to manage the configuration file; "level" indicates a risk level of each vulnerability; and "URL type" and "URL suffix" in the configuration condition indicate the predetermined type and the predetermined suffix of the vulnerability that needs to be detected in the embodiment. For example, the vulnerability that needs to be detected for the configuration file is a structs vulnerability, and then the "URL type" is set to CGI, and the "URL suffix" is set to .action or .do; and then, when the detection is performed by using the configuration file, the indication information indicated by the configuration file may be matched, and then whether the vulnerability indicated by the configuration file exists on the to-be-detected Web page may be determined. By performing detection on the vulnerability on the to-be-detected Web page by using the configuration file, whether the vulnerability indicated by the configuration file shown in FIG. 4 exists on the to-be-detected Web page is detected.

Optionally, in the embodiment, the test sample is used to further detect the vulnerability that exists on the to-be-detected target Web page. For example, an input address of the test sample is a parameter A, and the input manner is "replacement"; and then the parameter A of the to-be-detected target Web page is traversed in turn, and a value of the parameter A is replaced with a value itest of the test sample, to implement that the vulnerability detection is performed on the to-be-detected target Web page.

For example, with reference to the hardware scenario shown in FIG. 2, a process of an interaction between the control server 202 and one of the Web servers 204 may be shown in FIG. 3:

S302: Enter a to-be-detected target Web page into a control server 202.

S304: The control server 202 sends a test sample indicated by indication information in a configuration file to a Web server 204.

S306: The Web server 204 feeds back a test result to the control server 202 in response to the test sample.

S308: The control server 202 determines whether the test result meets a regular expression indicated by the indication information in the configuration file.

Optionally, in the embodiment, a matching manner of the regular expression includes but is not limited to: matching of the test result fed back for the to-be-detected Web page is determined, where the matching may be that regular matching is performed on at least one part of the head, body, and full text hend|body of the HTTP that is returned by the to-be-detected Web page.

Figure 5:
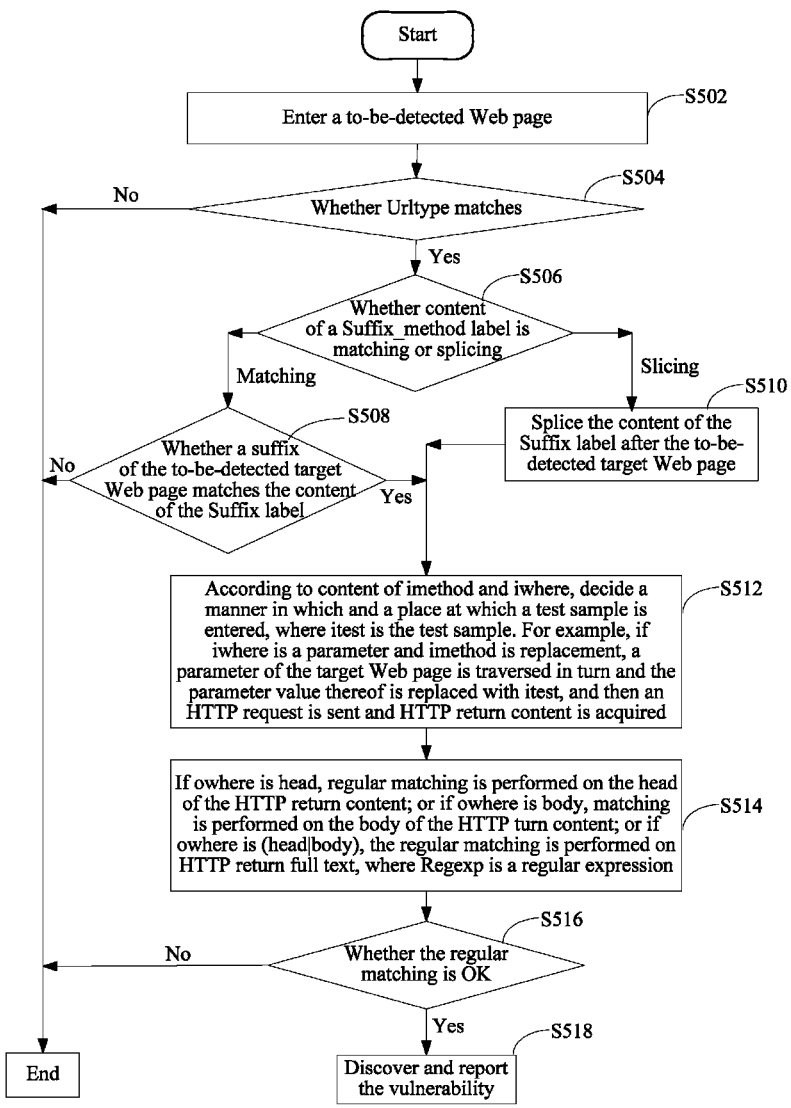
FIG. 5 illustrates a schematic flowchart of another optional Web page vulnerability detection method according to an embodiment of the present invention.

Further, a process of the Web page vulnerability detection method is described specifically with reference to FIG. 5:

S502: Enter a to-be-detected Web page.

S504: Determines whether a predetermined type Urltype of the to-be-detected Web page matches, and if yes, perform step S506; or if not, end the detection.

S506: If yes, determine whether content of a Suffix-_method label of a to-be-detected target Web page is matching or splicing, and if the content is matching, perform step S508; or if the content is splicing, perform step S510.

S508: Check whether a suffix of the to-be-detected target Web page matches the predetermined suffix Suffix label.

S510: Splice the predetermined suffix Suffix label after the to-be-detected target Web page.

S512 to S516: Perform detection on a to-be-detected vulnerability on the to-be-detected target Web page by using a test sample.

S518: Report the detected vulnerability.

Further, a detection manner of the steps S512 to S516 may be that: the test sample corresponding to the vulnerability that needs to be detected is sent to the to-be-detected target Web page, the to-be-detected target Web page responds for the test sample, and returns a corresponding test result, and matching is performed on the test result and the regular expression; and if they match, it indicates that the vulnerability indicated by the test sample exists on the to-be-detected target Web page.

Optionally, in the embodiment, the matching in the step S508 may be that search matching is performed on the predetermined suffix of the to-be-detected Web page, to screen out the corresponding the to-be-detected target Web page to perform vulnerability detection. The splicing in the step S510 may be that an address of a specific target Web page is spliced to obtain the to-be-detected target Web page, and furthermore the vulnerability detection is performed on the to-be-detected target Web page.

In the embodiment provided by the present disclosure, vulnerability detection is performed on a received to-be-detected target Web page by using an obtained configuration file corresponding to a vulnerability detection task, where the configuration file includes a matching condition used to match the to-be-detected target Web page in to-be-detected Web pages and indication information of a test sample used to perform vulnerability detection on the to-be-detected target Web page. Performing detection on a Web page vulnerability by using the configuration file prevents a problem that efficiency of the vulnerability detection is low because detection algorithms are developed again for different types of Web page vulnerabilities, implementing an effect of improving that efficiency of the vulnerability detection.

As an optional solution, the step S106 of detecting whether the vulnerability indicated by the configuration file exists on the to-be-detected target Web page by using the configuration file includes:

S1: Determine whether a received to-be-detected Web page meets a matching condition.

S2: If the to-be-detected Web page meets the matching condition, use the to-be-detected Web page as the to-be-detected target Web page, and detect whether the vulnerability indicated by the configuration file exists on the to-be-detected target Web page by using the test sample indicated by the indication information in the configuration file.

Optionally, in the embodiment, the matching condition includes a predetermined type and a predetermined suffix, where the predetermined type is used to match a type of an address of a to-be-detected Web page, and the predetermined suffix is used to match a suffix whose type is the predetermined type.

Optionally, in the embodiment, the "matching" in the step S508 in FIG. 5 may be that search matching is performed on a specific suffix of the to-be-detected Web page, to screen out the corresponding the to-be-detected target Web page to perform vulnerability detection. For example, a matching manner is selected to search for a Web page whose suffix is ".action", and the vulnerability detection is performed on the found Web page by using the test sample. The "splicing" in the step S510 in FIG. 5 may be that an address of a specific target Web page is spliced to obtain the to-be-detected target Web page, and then the vulnerability detection is performed on the to-be-detected target Web page; for example, the specific target Web page is www.baidu.com, and a suffix to be spliced is ".action", and then after a splicing manner is selected, the vulnerability detection is performed on the spliced Web page by using the test sample.

Description is provided specifically with reference to FIG. 5. It is assumed that the configuration file is used to detect the structs vulnerability, for example, as shown in steps S502 to S510, the to-be-detected Web page is enters, then whether the to-be-detected Web page matches the predetermined type (for example, the CGI) in Urltype is determined, and is yes, whether the to-be-detected Web page matches the predetermined suffix Suffix label or splices the predetermined suffix Suffix label is further determined, to determine and obtain the to-be-detected target Web page, and then the vulnerability detection is performed on the to-be-detected target Web page that is screened out.

Further, whether a corresponding vulnerability exists on the to-be-detected target Web page is detected by using the test sample in the configuration file, and a manner of the detection may include but is not limited to: sending the test sample to the to-be-detected target Web page, and performing matching on the regular expression by using the test result for the to-be-detected target Web page, to detect whether the vulnerability indicated by the configuration file exists on the to-be-detected target Web page.

In the embodiment provided by the present disclosure, to-be-detected Web pages are screened by using a matching condition in a configuration file, to obtain a to-be-detected target Web page that matches the matching condition, and then whether a vulnerability indicated by the configuration file exists on the to-be-detected target Web page is further detected on the to-be-detected target Web page by using a test sample.

As an optional solution, the determining whether a received to-be-detected Web page meets a matching condition includes one of the following:

As an optional implementation manner, whether a type of an address of a to-be-detected Web page is a predetermined type indicated in the matching condition is determined, and if the type of the address of the to-be-detected Web page is the predetermined type, it is determined that the to-be-detected Web page meets the matching condition; or description is provided specifically with reference to step S504 shown in FIG. 5, whether Urltype matches is determined; and if a type of the to-be-detected target Web page is the predetermined type Urltype (for example, the CGI), it is determined that the to-be-detected target Web page meets the matching condition; or if a type of the to-be-detected target Web page is not the predetermined type, it is detected that the vulnerability indicated by the configuration file does not exist on the to-be-detected Web page.

As another optional implementation manner, whether a type of an address of a to-be-detected Web page is a predetermined type indicated in the matching condition is determined, and if the type of the address of the to-be-detected Web page is the predetermined type, whether a suffix of an address whose type is the predetermined type is the predetermined suffix indicated in the matching condition is determined, and if the suffix of the address whose type is the predetermined type is the predetermined suffix, it is determined that the to-be-detected Web page meets the matching condition; or description is provided specifically with reference to FIG. 5, step S504 of determining whether Urltype matches is performed; if a type of the to-be-detected target Web page is the predetermined type Urltype (for example, the CGI) steps S506 to S508 are performed, and whether a suffix of an address of the to-be-detected target Web page whose type is the predetermined type (for example, the CGI) is the predetermined suffix Suffix label indicated in the matching condition (for example, the suffix is ".php"); and if the suffix of the address whose type is the predetermined type (for example, the suffix is ".php"), it is determined that the to-be-detected Web page meets the matching condition.

As still another optional implementation manner, whether a type of an address of a to-be-detected Web page is a predetermined type indicated in the matching condition is determined, and if the type of the address of the to-be-detected Web page is the predetermined type, it is determined that the to-be-detected Web page meets the matching condition, and the address of the to-be-detected Web page is spliced, to obtain the to-be-detected target Web page.

Description is provided specifically with reference to step S504 shown in FIG. 5, whether Urltype matches is determined; and if a type of the to-be-detected target Web page is the predetermined type Urltype (for example, the CGI), steps S506 to S510 shown in FIG. 5 are performed, to determine that the to-be-detected target Web page meets the matching condition, splice the address of the to-be-detected Web page, and splice the predetermined suffix Suffix label, to obtain the to-be-detected target Web page, so as to implement that the vulnerability detection is performed the to-be-detected target Web page.

In the embodiment provided by the present disclosure, matching of a predetermined type, a predetermined suffix, and a predetermined condition in a matching condition is determined, to obtain a to-be-detected target Web page corresponding to the matching condition, and then vulnerability detection is performed on the to-be-detected target Web page that is screened out.

Figure 6:
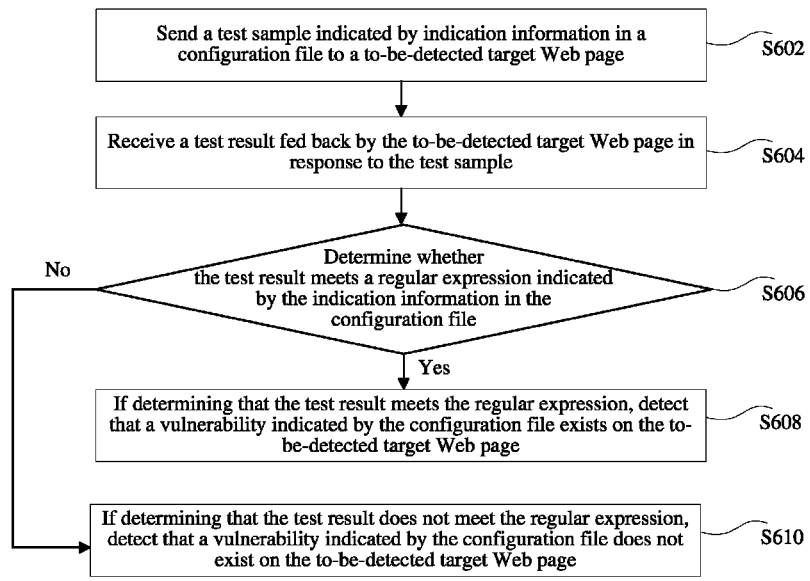
FIG. 6 illustrates a schematic flowchart of still another optional Web page vulnerability detection method according to an embodiment of the present invention.

As an optional solution, as shown in FIG. 6, the detecting whether the vulnerability indicated by the configuration file exists on the to-be-detected target Web page by using the test sample indicated by the indication information in the configuration file includes:

S602: Send a test sample indicated by indication information in a configuration file to a to-be-detected target Web page.

S604: Receive a test result fed back by the to-be-detected target Web page in response to the test sample.

S606: Determine whether the test result meets a regular expression indicated by the indication information in the configuration file.

S608: If determining that the test result meets the regular expression, detect that a vulnerability indicated by the configuration file exists on the to-be-detected target Web page.

Description is provided specifically with reference to S512 to S516 that are shown in FIG. 5, the indication information indicated by the test sample (for example, by using an itest identifier) in the configuration file is that: an address of the test sample is a parameter A, and an input manner is "replacement". When the test sample performs detection on the to-be-detected target Web page, the parameter A of the to-be-detected target Web page is traversed in turn, so that a value of the parameter A is replaced with itest, a request for a link to the to-be-detected target Web page is sent, and content fed back by the to-be-detected Web page is obtained.

Further, regular matching is performed by using content in the regular expression and the content fed back by the to-be-detected Web page, and whether the vulnerability indicated by the configuration file exists on the to-be-detected target Web page.

In the embodiment provided by the present disclosure, further vulnerability detection is performed on a to-be-detected target Web page by using a test sample, so that a vulnerability indicated by a configuration file is furthermore detected, implementing that the vulnerability detection is performed on the to-be-detected target Web page by using the test sample in the configuration file, and preventing algorithms from being developed for multiple times; and it only needs to configure different test samples in the configuration file, and then the vulnerability detection performed for different types of Web page vulnerabilities may be implemented.

As an optional implementation manner, before the receiving a vulnerability detection task for performing vulnerability detection on a to-be-detected target Web page, the method further includes:

S1: Generate different configuration files for different vulnerability detection tasks according to a same configuration template or different configuration templates.

Optionally, in the embodiment, different configuration files may be configured by using a configuration template, where the configuration template includes an argument corresponding to the matching condition and the test sample in the configuration file, arguments in the different configuration templates are different, and values of the argument in the different configuration files that are generated according to the same configuration template are different.

In the embodiment provided by the present disclosure, a general feature of a vulnerability that needs to be detected is configured by using a configuration template, to obtain a corresponding configuration file, where different arguments are set to obtain different configuration files, or different values are assigned to arguments in a same configuration file, so that on the basis of not needing to develop detection algorithms for multiple times, different types of Web page vulnerabilities are detected by using the different configuration files, not only reducing workload of the vulnerability detection, but also improving efficiency of detecting a Web page vulnerability.

It should be noted that, for the foregoing method embodiments, for a purpose of simple description, each method embodiment is described as a combination of a series of actions; however, a person skilled in the art should know that, the present disclosure is not limited by the described action sequence, because according to the present disclosure, some steps can be performed in another sequence or synchronously. Secondly, the person skilled in the art should also know that, all the embodiments described in the specification are preferred embodiments, and the involved actions and modules are not necessarily required by the present disclosure.

Through the foregoing description of the embodiments, a person skilled in the art can clearly understand that the method according to the foregoing embodiments may be implemented by software in addition to a necessary universal hardware platform, and definitely may also be implemented by hardware. However, under most circumstances, the former is preferred. Based on such an understanding, the technical solutions of the present disclosure essentially or the part contributing to the prior art may be implemented in a form of a software product. The computer software product is stored in one storage medium (such as a read-only memory (ROM)/a random access memory (RAM), a magnetic disk, and an optical disc), and includes several instructions for instructing a terminal device (which may be a mobile phone, a computer, a server, or a network device) to perform the method described in the embodiments of the present invention.

Embodiment 2

Figure 7:
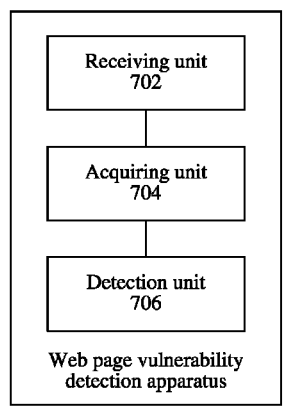
FIG. 7 illustrates a schematic structural diagram of an optional Web page vulnerability detection apparatus according to an embodiment of the present invention.

According to the embodiment of the present invention, a Web page vulnerability detection apparatus is further provided, as shown in FIG. 7, and the apparatus includes:

1) a receiving unit 702, configured to receive a vulnerability detection task for performing vulnerability detection on a to-be-detected target Web page, the vulnerability detection task being at least used to indicate a vulnerability that needs to be detected;

2) an acquiring unit 704, configured to acquire a configuration file corresponding to the vulnerability according to the vulnerability detection task, where the configuration file includes a matching condition used to match the to-be-detected target Web page in to-be-detected Web pages and indication information of a test sample used to perform vulnerability detection on the to-be-detected target Web page; and 3) a detection unit 706, configured to detect whether the vulnerability indicated by the configuration file exists on the to-be-detected target Web page by using the configuration file.

Optionally, in the embodiment, the Web page vulnerability detection apparatus may be applied in a hardware environment shown in FIG. 2, which is formed by a control server 202 and multiple Web servers 204. As shown in FIG. 2, the Web page vulnerability detection apparatus may be but is not limited to be located in the control server 202, where the to-be-detected target Web page is a Web page for performing vulnerability detection, which matches the configuration file and is screened out from the to-be-detected Web pages.

Optionally, for different types of Web page vulnerabilities, there may be different configuration templates, and different configuration files are generated for different vulnerability detection tasks according to a same configuration template or different configuration templates, where the configuration template includes an argument corresponding to the matching condition and the test sample in the configuration file, arguments in the different configuration templates are different, and values of the argument in the different configuration files that are generated according to the same configuration template are different. Furthermore, it is implemented that the vulnerability detection is performed on the different types of Web page vulnerabilities by using the configuration templates, to achieve an objective of improving efficiency of detecting a Web page vulnerability. The foregoing example is only one example, and the embodiment does not have any limit on the foregoing example.

Optionally, in the embodiment, the vulnerability detection task may include but is not limited to indicating a vulnerability that needs to be detected, and indicating a to-be-detected target Web page that needs to be detected, where information for indicating the to-be-detected target Web page may include at least a type of the to-be-detected Web page, and a suffix of the to-be-detected target Web page.

Optionally, in the embodiment, the configuration file further includes at least one of the following: description information of the configuration file, a sequence number of the configuration file, a risk level of the vulnerability indicated by the configuration file, a configuration condition, and a test sample, where the configuration condition includes but is not limited to: a predetermined type and a predetermined suffix, where the predetermined type is used to match a type of an address of a to-be-detected Web page, and the predetermined suffix is used to match a suffix whose type is the predetermined type; and the indication information of the test sample includes at least: an address of the test sample, an input manner of the test sample, description information of a vulnerability indicated by the test sample, and a regular expression indicated by the test sample.

Optionally, in the embodiment, the matching condition is used to screen the to-be-detected Web pages, to obtain the to-be-detected target Web page on which the vulnerability that needs to be detected exists, where the predetermined type in the matching condition may include but is not limited to: a type for matching the address of the to-be-detected Web page, for example, the type may be a CGI, a static page, or a directory. For example, the CGI is a Web page on which a user enters a parameter for a variable, for example, a.php?user=bingo. The predetermined suffix in the matching condition may be but is not limited to a suffix for matching an address whose type is the predetermined type, for example, for a structs vulnerability, only a CGI whose suffix is .action or .do. A predetermined condition in the matching condition may include but is not limited to: for matching address information obtained by splicing an address whose type is the predetermined type.

Specifically with reference to the following example, FIG. 4 shows a schematic diagram of the configuration file, where "rulename" indicates description information of the configuration file. One configuration file may consists of multiple arguments; "cveid" is a unique sequence number of the configuration file, so as to manage the configuration file; "level" indicates a risk level of each vulnerability; and "URL type" and "URL suffix" in the configuration condition indicate the predetermined type and the predetermined suffix of the vulnerability that needs to be detected in the embodiment. For example, the vulnerability that needs to be detected for the configuration file is a structs vulnerability, and then the "URL type" is set to CGI, and the "URL suffix" is set to .action or .do; and then, when the detection is performed by using the configuration file, the indication information indicated by the configuration file may be matched, and then whether the vulnerability indicated by the configuration file exists on the to-be-detected Web page may be determined. By performing detection on the vulnerability on the to-be-detected Web page by using the configuration file, whether the vulnerability indicated by the configuration file shown in FIG. 4 exists on the to-be-detected Web page is detected.

Optionally, in the embodiment, the test sample is used to further detect the vulnerability that exists on the to-be-detected target Web page. For example, an input address of the test sample is a parameter A, and the input manner is "replacement"; and then the parameter A of the to-be-detected target Web page is traversed in turn, and a value of the parameter A is replaced with a value itest of the test sample, to implement that the vulnerability detection is performed on the to-be-detected target Web page.

Optionally, in the embodiment, a matching manner of the regular expression includes but is not limited to: matching of the test result fed back for the to-be-detected Web page is determined, where the matching may be that regular matching is performed on at least one part of the head, body, and full text hend|body of the HTTP that is returned by the to-be-detected Web page.

Further, a process in which the Web page vulnerability detection apparatus executes the Web page vulnerability detection method is described specifically with reference to FIG. 5:

S502: Enter a to-be-detected Web page into a Web page vulnerability detection apparatus.

S504: Determines whether a predetermined type Urltype of the to-be-detected Web page matches by using a determining module in the Web page vulnerability detection apparatus, and if yes, perform step S506; or if not, end this detection.

S506: If yes, further determine, by using the determining module, whether content of a Suffix_method label of a to-be-detected target Web page is matching or splicing, and if the content is matching, perform step S508; or if the content is splicing, perform step S510.

S508: Then check whether a suffix of the to-be-detected target Web page matches the predetermined suffix Suffix label by using the detection module in the Web page vulnerability detection apparatus.

S510: Further splice the predetermined suffix Suffix label after the to-be-detected target Web page.

S512 to S516: Perform, by using the detection module, detection on a to-be-detected vulnerability on the to-be-detected target Web page by using a test sample.

S518: Report the detected vulnerability.

Further, a detection manner of the steps S512 to S516 may be that: the test sample corresponding to the vulnerability that needs to be detected is sent to the to-be-detected target Web page, the to-be-detected target Web page responds for the test sample, and returns a corresponding test result, and matching is performed on the test result and the regular expression; and if they match, it indicates that the vulnerability indicated by the test sample exists on the to-be-detected target Web page.

Optionally, in the embodiment, the matching in the step S508 may be that search matching is performed on the predetermined suffix of the to-be-detected Web page, to screen out the corresponding the to-be-detected target Web page to perform vulnerability detection. The splicing in the step S510 may be that an address of a specific target Web page is spliced to obtain the to-be-detected target Web page, and furthermore the vulnerability detection is performed on the to-be-detected target Web page.

In the embodiment provided by the present disclosure, vulnerability detection is performed on a received to-be-detected target Web page by using an obtained configuration file corresponding to a vulnerability detection task, where the configuration file includes a matching condition used to match the to-be-detected target Web page in to-be-detected Web pages and indication information of a test sample used to perform vulnerability detection on the to-be-detected target Web page. Performing detection on a Web page vulnerability by using the configuration file prevents a problem that efficiency of the vulnerability detection is low because detection algorithms need to be developed again for different types of Web page vulnerabilities, implementing an effect of improving that efficiency of the vulnerability detection.

As an optional solution, the detection unit 706 includes:

1) a determining module, configured to determine whether a received to-be-detected Web page meets the matching condition; and 2) a detection module, configured to: when the to-be-detected Web page meets the matching condition, use the to-be-detected Web page as the to-be-detected target Web page, and detect whether the vulnerability indicated by the configuration file exists on the to-be-detected target Web page by using the test sample indicated by the indication information in the configuration file.

Optionally, in the embodiment, the matching condition includes a predetermined type and a predetermined suffix, where the predetermined type is used to match a type of an address of a to-be-detected Web page, and the predetermined suffix is used to match a suffix whose type is the predetermined type.

Optionally, in the embodiment, the "matching" shown in FIG. 5 may be that search matching is performed on a specific suffix of the to-be-detected Web page, to screen out the corresponding the to-be-detected target Web page to perform vulnerability detection. For example, a matching manner is selected to search for a Web page whose suffix is ".action", and the vulnerability detection is performed on the found Web page by using the test sample. The "splicing" shown in FIG. 5 may be that an address of a specific target Web page is spliced to obtain the to-be-detected target Web page, and then the vulnerability detection is performed on the to-be-detected target Web page; for example, the specific target Web page is www.baidu.com, and a suffix to be spliced is ".action", and then after a splicing manner is selected, the vulnerability detection is performed on the spliced Web page by using the test sample.

Description is provided specifically with reference to FIG. 5. It is assumed that the configuration file is used to detect the structs vulnerability, for example, as shown in steps S502 to S510, the to-be-detected Web page is enters, then whether the to-be-detected Web page matches the predetermined type (for example, the CGI) in Urltype is determined, and is yes, whether the to-be-detected Web page matches the predetermined suffix Suffix label or splices the predetermined suffix Suffix label is further determined, to determine and obtain the to-be-detected target Web page, and then the vulnerability detection is performed on the to-be-detected target Web page that is screened out.

Further, whether a corresponding vulnerability exists on the to-be-detected target Web page is detected by using the test sample in the configuration file, and a manner of the detection may include but is not limited to: sending the test sample to the to-be-detected target Web page, and performing matching on the regular expression by using the test result for the to-be-detected target Web page, to detect whether the vulnerability indicated by the configuration file exists on the to-be-detected target Web page.

In the embodiment provided by the present disclosure, to-be-detected Web pages are screened by using a matching condition in a configuration file, to obtain a to-be-detected target Web page that matches the matching condition, and then whether a vulnerability indicated by the configuration file exists on the to-be-detected target Web page is further detected on the to-be-detected target Web page by using a test sample.

As an optional solution, the determining module includes one of the following:

1) a first determining submodule, configured to determine whether a type of an address of the to-be-detected Web page is a predetermined type indicated in the matching condition, and if the type of the address of the to-be-detected Web page is the predetermined type, determine that the to-be-detected Web page meets the matching condition; or description is provided specifically with reference to step S504 shown in FIG. 5, whether Urltype matches is determined; and if a type of the to-be-detected target Web page is the predetermined type Urltype (for example, the CGI), it is determined that the to-be-detected target Web page meets the matching condition; or if a type of the to-be-detected target Web page is not the predetermined type, it is detected that the vulnerability indicated by the configuration file does not exist on the to-be-detected Web page;

2) a second determining submodule, configured to determine whether a type of an address of the to-be-detected Web page is a predetermined type indicated in the matching condition, if the type of the address of the to-be-detected Web page is the predetermined type, determine whether a suffix of the address whose type is the predetermined type is a predetermined suffix indicated in the matching condition, and if the suffix of the address whose type is the predetermined type is the predetermined suffix, determine that the to-be-detected Web page meets the matching condition; or description is provided specifically with reference to step S504 shown in FIG. 5, and whether Urltype matches is determined; if a type of the to-be-detected target Web page is the predetermined type Urltype (for example, the CGI) steps S506 to S508 are performed, and whether a suffix of an address of the to-be-detected target Web page whose type is the predetermined type (for example, the CGI) is the predetermined suffix Suffix label indicated in the matching condition (for example, the suffix is ".php"); and if the suffix of the address whose type is the predetermined type (for example, the suffix is ".php"), it is determined that the to-be-detected Web page meets the matching condition; and 3) a third determining submodule, configured to determine whether a type of an address of the to-be-detected Web page is a predetermined type indicated in the matching condition, and if the type of the address of the to-be-detected Web page is the predetermined type, determine that the to-be-detected Web page meets the matching condition, and splicing the address of the to-be-detected Web page, to obtain the to-be-detected target Web page; or description is provided specifically with reference to step S504 shown in FIG. 5, whether Urltype matches is determined; and if a type of the to-be-detected target Web page is the predetermined type Urltype (for example, the CGI), steps S506 to S510 shown in FIG. 5 are performed, to determine that the to-be-detected target Web page meets the matching condition, splice the address of the to-be-detected Web page, and splice the predetermined suffix Suffix label, to obtain the to-be-detected target Web page, so as to implement that the vulnerability detection is performed the to-be-detected target Web page.

In the embodiment provided by the present disclosure, matching of a predetermined type, a predetermined suffix, and a predetermined condition in a matching condition is determined, to obtain a to-be-detected target Web page corresponding to the matching condition, and then vulnerability detection is performed on the to-be-detected target Web page that is screened out.

As an optional solution, the detection module includes:

1) a sending submodule, configured to send the test sample indicated by the indication information in the configuration file to the to-be-detected target Web page;

2) a receiving submodule, configured to receive a test result fed back by the to-be-detected target Web page in response to the test sample;

3) a fourth determining submodule, configured to determine whether the test result meets a regular expression indicated by the indication information in the configuration file; and 4) a detection submodule, configured to: when it is determined that the test result meets the regular expression, detect that the vulnerability indicated by the configuration file exists on the to-be-detected target Web page.

Description is provided specifically with reference to S512 to S516 that are shown in FIG. 5, the indication information indicated by the test sample (for example, by using an itest identifier) in the configuration file is that: an address of the test sample is a parameter A, and an input manner is "replacement". When the test sample performs detection on the to-be-detected target Web page, the parameter A of the to-be-detected target Web page is traversed in turn, so that a value of the parameter A is replaced with itest, a request for a link to the to-be-detected target Web page is sent, and content fed back by the to-be-detected Web page is obtained.

Further, regular matching is performed by using content in the regular expression and the content fed back by the to-be-detected Web page, and whether the vulnerability indicated by the configuration file exists on the to-be-detected target Web page.

In the embodiment provided by the present disclosure, further vulnerability detection is performed on a to-be-detected target Web page by using a test sample, so that a vulnerability indicated by a configuration file is furthermore detected, implementing that the vulnerability detection is performed on the to-be-detected target Web page by using the test sample in the configuration file, and preventing algorithms from being developed for multiple times; and it only needs to configure different test samples in the configuration file, and then the vulnerability detection performed for different types of Web page vulnerabilities may be implemented.

Figure 8:
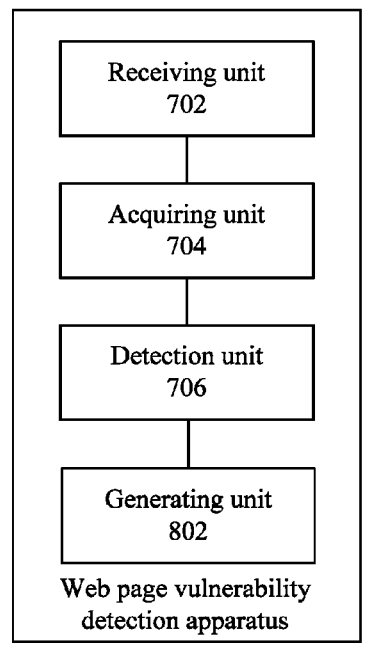
FIG. 8 illustrates a schematic structural diagram of another optional Web page vulnerability detection apparatus according to an embodiment of the present invention.

As an optional solution, as shown in FIG. 8, the apparatus further includes:

1) a generating unit 802, configured to: before the receiving a vulnerability detection task for performing vulnerability detection on a to-be-detected target Web page, generate, for different detection tasks, different configuration files according to a same configuration template or different configuration templates, where the configuration template includes an argument corresponding to the matching condition and the test sample in the configuration file, arguments in the different configuration templates are different, and values of the argument in the different configuration files that are generated according to the same configuration template are different.

In the embodiment provided by the present disclosure, a general feature of a vulnerability that needs to be detected is configured by using a configuration template, to obtain a corresponding configuration file, where different arguments are set to obtain different configuration files, or different values are assigned to arguments in a same configuration file, so that on the basis of not needing to develop detection algorithms for multiple times, different types of Web page vulnerabilities are detected by using the different configuration files, not only reducing workload of the vulnerability detection, but also improving efficiency of detecting a Web page vulnerability.

The foregoing sequence numbers of the embodiments of the present invention are only for description, and do not represent goodness and badness of the embodiments.

Embodiment 3

Figure 9:
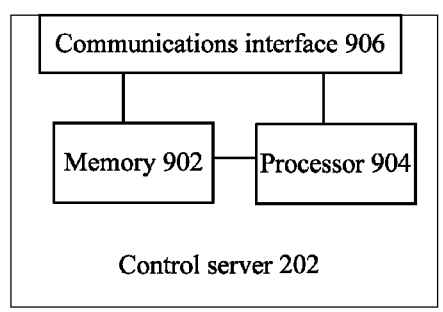
FIG. 9 illustrates a schematic structural diagram of an optional control server in which a Web page vulnerability detection method is applied according to an embodiment of the present invention.

According to this embodiment of the present invention, a control server 202 for implementing the Web page vulnerability detection method is further provided. As shown in FIG. 9, the control server 202 includes a memory 902, a processor 904, and a communications interface 906.

1) The memory 902 is set to store a configuration template and a configuration file in the foregoing Web page vulnerability detection apparatus, and is configured to store a test sample library of the foregoing test sample.

Optionally, in the embodiment, content stored in the memory 902 may be acquired from another server other than the control server 202, and this embodiment does not have any limit on this.

Optionally, in the embodiment, the memory 902 may be further configured to store other data stored in the detection process in foregoing Embodiment 1.

2) The processor 904 is set to perform the following operations on the modules in the foregoing Web page vulnerability detection apparatus:

S1: Receive a vulnerability detection task for performing vulnerability detection on a to-be-detected target Web page, where the vulnerability detection task are at least used to indicate a vulnerability that needs to be detected.

S2: Acquire a configuration file corresponding to the vulnerability according to the vulnerability detection task, where the configuration file includes a matching condition used to match the to-be-detected target Web page in to-be-detected Web pages and indication information of a test sample used to perform vulnerability detection on the to-be-detected target Web page.

S3: Detect whether the vulnerability indicated by the configuration file exists on the to-be-detected target Web page by using the configuration file.

Optionally, in the embodiment, the processor 904 may further perform another detection step in the foregoing Embodiment 1, and details are not provided again herein.

3) The communications interface 906 is set to perform data interaction with the foregoing Web server 204.

Optionally, in the embodiment, the control server 202 may be applied in a hardware environment shown in FIG. 2, which is formed by the control server 202 and multiple Web servers 204. As shown in FIG. 2, the control server 202 performs, by using the configuration file, vulnerability detection on any Web server 204 in which the to-be-detected target Web page is located, where the to-be-detected target Web page is a Web page for performing vulnerability detection, which matches the configuration file and is screened out from the to-be-detected Web pages.

Optionally, for a specific example In the embodiment, reference may be made to the examples described in the foregoing Embodiment 1 and Embodiment 2, and details are not provided again herein In the embodiment.

The foregoing sequence numbers of the embodiments of the present invention are only for description, and do not represent goodness and badness of the embodiments.

Embodiment 4

This embodiment of the present invention further provides a storage medium. Optionally, in the embodiment, the storage medium may be applied to a Web page vulnerability detection method.

Optionally, in the embodiment, the storage medium is set to store program code for performing the following steps:

S1: Receive a vulnerability detection task for performing vulnerability detection on a to-be-detected target Web page, where the vulnerability detection task are at least used to indicate a vulnerability that needs to be detected.

S2: Acquire a configuration file corresponding to the vulnerability according to the vulnerability detection task, where the configuration file includes a matching condition used to match the to-be-detected target Web page in to-be-detected Web pages and indication information of a test sample used to perform vulnerability detection on the to-be-detected target Web page.

S3: Detect whether the vulnerability indicated by the configuration file exists on the to-be-detected target Web page by using the configuration file.

Optionally, the storage medium is further set to store program code for performing the following step:

S1: Before the receiving a vulnerability detection task for performing vulnerability detection on a to-be-detected target Web page, generate, for different vulnerability detection tasks, different configuration files according to a same configuration template or different configuration templates, where the configuration template includes an argument corresponding to the matching condition and the test sample in the configuration file, arguments in the different configuration templates are different, and values of the argument in the different configuration files that are generated according to the same configuration template are different.

Optionally, in the embodiment, the storage medium may be applied in a hardware environment shown in FIG. 2, which is formed by a control server 202 and multiple Web servers 204. Optionally, the storage medium may but is not limited to be located in the control server 202.

Optionally, the configuration file further includes at least one of the following: description information of the configuration file, a sequence number of the configuration file, a risk level of the vulnerability indicated by the configuration file, a predetermined type, and a predetermined suffix, where the predetermined type is used to match a type of an address of a to-be-detected Web page, and the predetermined suffix is used to match a suffix whose type is the predetermined type; and the indication information of the test sample includes at least: an address of the test sample, an input manner of the test sample, description information of a vulnerability indicated by the test sample, and a regular expression indicated by the test sample.

Optionally, in the embodiment, the foregoing storage medium may include but is not limited to: any medium that can store program code, such as a USB flash drive, a ROM, a RAM, a removable hard disk, a magnetic disk, or an optical disc.

Optionally, for a specific example In the embodiment, reference may be made to the examples described in the foregoing Embodiment 1 and Embodiment 2, and details are not provided again herein In the embodiment.

The foregoing sequence numbers of the embodiments of the present invention are only for description, and do not represent goodness and badness of the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium, and includes several instructions for instructing one or more computer device (which may be a personal computer, a server, or a network device) to perform all or some of the steps of the methods described in the embodiments of the present invention.

In the foregoing embodiments of the present invention, the description of each embodiment has different emphases; for content that is not detailed in an embodiment, see the relevant description of another embodiment.

In the several embodiments provided in the present application, it should be understood that the disclosed client may be implemented in another manner. The described apparatus embodiment is merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The sequence numbers of the above embodiments of the disclosure are only for the purpose of description, and do not represent one embodiment is superior to another.

The foregoing is only example implementation manners of the present disclosure, it shall be pointed out that, a person of ordinary skill in the art may further perform several improvements and embellishments while the principles of the present disclosure are not disobeyed. These improvements and embellishments shall also be considered to fall within the protection scope of the present disclosure.

What is claimed is:

1. A Web page vulnerability detection method, comprising:
receiving a vulnerability detection task for performing vulnerability detection on a target Web page to be detected, the vulnerability detection task being at least used to indicate a vulnerability that needs to be detected;
acquiring a configuration file corresponding to the vulnerability according to the vulnerability detection task, the configuration file comprising a matching condition used to match the target Web page to be detected in Web pages to be detected and indication information of a test sample used to perform vulnerability detection on the target Web page to be detected, wherein the indication information of the test sample comprises at least: an address of the test sample, an input manner of the test sample, and the regular expression indicated by the test sample;
detecting whether the vulnerability indicated by the configuration file exists on the target Web page to be detected by using the configuration file.

2. The method according to claim 1, wherein the detecting whether the vulnerability indicated by the configuration file exists on the target Web page to be detected by using the configuration file comprises:
determining whether a received Web page to be detected meets the matching condition; and
if the Web page to be detected meets the matching condition, using the Web page to be detected as the target Web page to be detected, and detecting whether the vulnerability indicated by the configuration file exists on the target Web page to be detected by using the test sample indicated by the indication information in the configuration file.

3. The method according to claim 2, wherein the determining whether the received Web page to be detected meets the matching condition comprises:

determining whether a type of an address of the Web page to be detected is a predetermined type indicated in the matching condition.

4. The method according to claim 3, further comprising:
if the type of the address of the Web page to be detected is the predetermined type, determining that the Web page to be detected meets the matching condition.

5. The method according to claim 3, further comprising:
if the type of the address of the Web page to be detected is the predetermined type, determining whether a suffix of the address whose type is the predetermined type is a predetermined suffix indicated in the matching condition, and if the suffix of the address whose type is the predetermined type is the predetermined suffix, determining that the Web page to be detected meets the matching condition.

6. The method according to claim 3, further comprising:
if the type of the address of the Web page to be detected is the predetermined type, determining that the Web page to be detected meets the matching condition, and splicing the address of the Web page to be detected, to obtain the target Web page to be detected.

7. The method according to claim 3, wherein the determining whether a type of an address of the Web page to be detected is a predetermined type indicated in the matching condition comprises:
determining whether the type of the address of the Web page to be detected is a CGI type or a static page type or a directory type indicated in the matching condition, and if the type of the address of the Web page to be detected is the CGI type or the static page type or the directory type indicated in the matching condition, determining that the type of the address of the Web page to be detected is the predetermined type.

8. The method according to claim 2, wherein the detecting whether the vulnerability indicated by the configuration file exists on the target Web page to be detected by using the test sample indicated by the indication information in the configuration file comprises:
sending the test sample indicated by the indication information in the configuration file to the target Web page to be detected; and
receiving a test result fed back by the target Web page to be detected in response to the test sample.

9. The method according to claim 8, wherein the detecting whether the vulnerability indicated by the configuration file exists on the target Web page to be detected by using the test sample indicated by the indication information in the configuration file further comprises:
determining whether the test result meets a regular expression indicated by the indication information in the configuration file; and
if determining that the test result meets the regular expression, detecting that the vulnerability indicated by the configuration file exists on the target Web page to be detected.

10. The method according to claim 1, before the receiving a vulnerability detection task for performing vulnerability detection on the target Web page to be detected, the method further comprises:
generating, for different vulnerability detection tasks, different configuration files according to a same configuration template or different configuration templates, wherein the configuration template comprises an argument corresponding to the matching condition and the test sample in the configuration file, arguments in the different configuration templates are different, and values of the argument in the different configuration files that are generated according to the same configuration template are different.

11. The method according to claim 1, wherein the matching condition comprises at least one of the following: the predetermined type and the predetermined suffix, wherein the predetermined type is used to match the type of the address of the Web page to be detected, and the predetermined suffix is used to match the suffix of the address whose type is the predetermined type.

12. A Web page vulnerability detection apparatus, comprising:
a receiving unit, configured to receive a vulnerability detection task for performing vulnerability detection on a target Web page to be detected, the vulnerability detection task being at least used to indicate a vulnerability that needs to be detected;
an acquiring unit, configured to acquire a configuration file corresponding to the vulnerability according to the vulnerability detection task, the configuration file comprising a matching condition used to match the target Web page in Web pages to be detected and indication information of a test sample used to perform vulnerability detection on the target Web page, wherein the indication information of the test sample comprises at least: an address of the test sample, an input manner of the test sample, and the regular expression indicated by the test sample;
a detection unit, configured to detect whether the vulnerability indicated by the configuration file exists on the target Web page by using the configuration file.

13. The apparatus according to claim 12, wherein the detection unit comprises:
a determining module, configured to determine whether a received Web page to be detected meets the matching condition; and
a detection module, configured to: when the Web page to be detected meets the matching condition, use the Web page to be detected as the target Web page to be detected, and detect whether the vulnerability indicated by the configuration file exists on the target Web page to be detected by using the test sample indicated by the indication information in the configuration file.

14. The apparatus according to claim 12, wherein the determining module comprises:
a first determining submodule, configured to determine whether a type of an address of the Web page is a predetermined type indicated in the matching condition, and if the type of the address of the Web page is the predetermined type, determine that the Web page meets the matching condition.

15. The apparatus according to claim 12, wherein the determining module comprises:
a second determining submodule, configured to determine whether a type of an address of the Web page is a predetermined type indicated in the matching condition, if the type of the address of the Web page is the predetermined type, determine whether a suffix of the address whose type is the predetermined type is a predetermined suffix indicated in the matching condition, and if the suffix of the address whose type is the predetermined type is the predetermined suffix, determine that the Web page meets the matching condition.

16. The apparatus according to claim 12, wherein the determining module comprises:
a third determining submodule, configured to determine whether a type of an address of the Web page is a predetermined type indicated in the matching condition, and if the type of the address of the Web page is the predetermined type, determine that the Web page meets the matching condition, and splicing the address of the Web page, to obtain the target Web page.

17. The apparatus according to claim 12, wherein the detection module comprises:
   a sending submodule, configured to send the test sample indicated by the indication information in the configuration file to the target Web page; and
   a receiving submodule, configured to receive a test result fed back by the target Web page in response to the test sample.

18. The apparatus according to claim 12, comprising:
   a generating unit, configured to: before the receiving a vulnerability detection task for performing vulnerability detection on the target Web page, generate, for different detection tasks, different configuration files according to a same configuration template or different configuration templates, wherein the configuration template comprises an argument corresponding to the matching condition and the test sample in the configuration file, arguments in the different configuration templates are different, and values of the argument in the different configuration files that are generated according to the same configuration template are different.

19. The apparatus according to claim 12, wherein the matching condition comprises at least one of the following: the predetermined type and the predetermined suffix, wherein the predetermined type is used to match the type of the address of the Web page, and the predetermined suffix is used to match the suffix of the address whose type is the predetermined type.

* * * * *